Sept. 8, 1970 N. SCHINK ET AL 3,527,661
METHOD OF OBTAINING PUREST SEMICONDUCTOR MATERIAL BY ELIMINATION OF CARBON-IMPURITIES
Filed Aug. 31, 1967
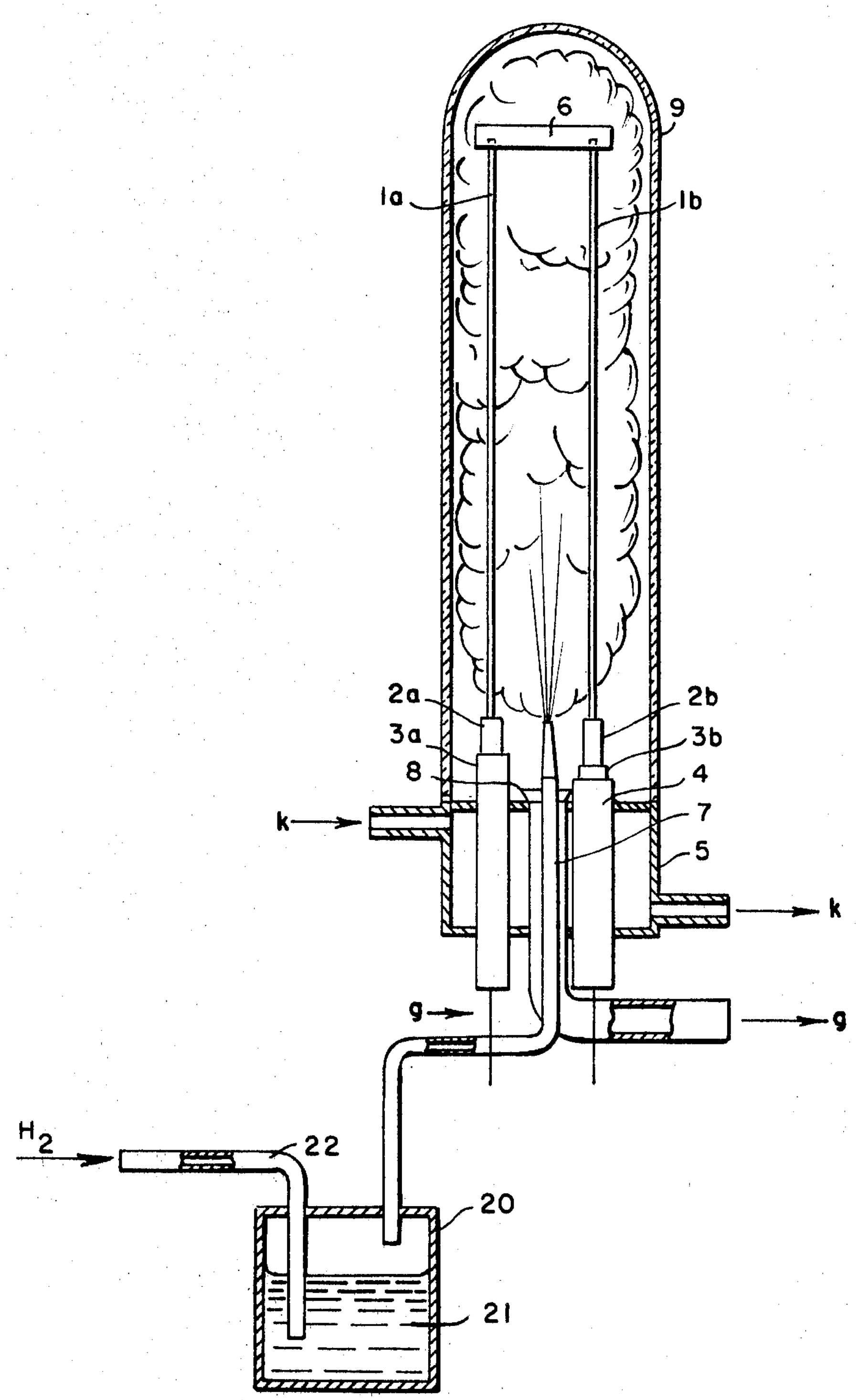

United States Patent Office 3,527,661
Patented Sept. 8, 1970

3,527,661

METHOD OF OBTAINING PUREST SEMICONDUCTOR MATERIAL BY ELIMINATION OF CARBON-IMPURITIES

Norbert Schink and Rupert Stoiber, Erlangen, Germany, assignors to Siemens Aktiengesellschaft, Berlin and Munich, Germany, a corporation of Germany Filed Aug. 31, 1967, Ser. No. 664,873
Claims priority, application Germany, Sept. 1, 1966, S 105,645; Aug. 17, 1967, S 111,390
Int. Cl. C01b 33/02
U.S. Cl. 117—201 12 Claims

ABSTRACT OF THE DISCLOSURE

Described is an improvement in the C process for preparing silicon. The C process is that shown in Schweikert et al. Pat. No. 3,011,877. Chromic acids of carbon compounds, which may be present in the liquid compound of semiconductor material for precipitating semiconductor material from its gaseous phase, are first formed. Said acids are then bound by sodium or potassium hydroxide.

The present invention relates to a method of obtaining purest semiconductor material, particularly silicon and germanium. In such method a liquid, carbon compound containing compound of the semiconductor material is vaporized. The semiconductor material is precipitated by at least a partial reaction of the gaseous compound, in a reaction vessel, upon a solid heated carrier by using a pure, gaseous reduction agent. The semiconductor material, which is processed into electronic components after a preliminary zone melting treatment, must be as free as possible of those impurities which cannot be sufficiently removed through zone melting. Carbon constitutes such an impurity which is insufficiently removed by crucible-free zone melting of semiconductor material, such as silicon or germanium. Semiconductor material, precipitated from the gaseous phase through reduction and/or pyrolytic dissociation may contain considerably more carbon, from impurities of the liquid semiconductor compound, than is soluble in the semiconductor material even at temperatures which closely approach the melting point. This is a result of the fact that during the purification and growth of the monocrystal by zone melting and indiffusing doping materials into semiconductor material at elevated temperatures, carbon crystallizes within the semiconductor crystal.

It had not been previously recognized that the carbon which crystallizes constitutes the primary source of disturbance, for example in the sense of a doping material, but it does constitute at least an undesirable unsafe factor in the production and/or operation of semiconductor components with one or more p-n junctions. The carbon crystals may cause secondary disturbances such as the reduction of the life span of the charge carriers or certain signs of old age, without permitting a recognition of the physical connections. Thus, the elimination of this unsafe factor increases the possibility of determining other sources of errors. Thus elimination of carbon impurities represents an improvement as to reproducibilities and to operational safety.

The impurities in the liquid compound of the semiconductor material which supply the carbon to the semiconductor material, precipitated from the gaseous phase of said liquid, are largely organic carbon compounds. The compounds are for the most part alkylsilanes which cannot be separated from the liquid compound of the semiconductor material by distillation of the latter. Instead, during vaporization of the liquid compound, these carbon compounds also enter the reaction gas mixture where they are dissociated to precipitate as a dissociation product, together with the semiconductor material upon the carrier.

Our invention has as an object to reduce the carbon content in semiconductor material, precipitated from the gaseous phase. We achieve this by oxidizing the carbon compounds contained in the liquid compound of the semiconductor material, prior to the evaporation of the same, by addition of an oxidizing agent and, subsequently reacting the oxidation products with a nonvolatile base. The oxidation products bound by the base remain, during the evaporation of the liquid compound of the semiconductor material, in the residual of the liquid and thus does not enter the reaction mixture.

Non-volatile bases are those which do not dissociate when heated and which have a very low vapor pressure. Particularly suitable are sodium hydroxide (NaOH) potassium hydroxide (KOH), or calcium hydroxide $$(Ca(OH)_2)$$

which are used in a solid, anhydrous form. As the oxidation agent, one may use an aqueous solution of chromium trioxide ($CrO_3$), of permanganic acid ($HMnO_4$) or bromic acid ($HBrO_3$).

The wetting of the solid, non-volatile base in the liquid compound of the semiconductor material and, thus, its reactivity may be favorably influenced if the oxidation agent is used in a sulphuric acid containing solution. To avoid self-ignition it is referred to add the reagents to the liquid compound of the semiconductor material, particularly the addition of non-volatile bases; in a protective gas atmosphere, preferably nitrogen.

The figure discloses apparatus for carrying out our invention.

We use apparatus such as that shown in Schweickert et al. Pat. No. 3,011,877. The apparatus is similar to that shown in the figure thereof. Schweickert et al. describe their apparatus as follows: "In FIG. 1 two thin silicon rods or rod sections or portions are denoted by *1a* and *1b*. The rods *1a* and *1b* may have a length of 0.5 m. and a diameter of 3 mm. Such rods remain self-supporting even in incandescent condition, such as at a temperature of 1100 to1200° C. The lower ends of the silicon rods *1a* and *1b* are inserted into respective holders *2a* and *2b* preferably consisting of graphite of highest purity, particularly the so-called "spectral carbon." Spectral carbon is obtainable in commerce in the form of rods of circular cross section and is normally used as electrodes for producing an arc for spectral analyses. Short pieces of such spectral carbon are provided at one front face with a slightly conical bore into which the end of a silicon rod can be pushed to firmly seat the rod in the holder. The holders may also be designed as clamps. For this purpose the graphite rod at its bored end may be split in half over a suitable axial length, one half remaining firmly joined with the body of the graphite rod whereas the other is severed from the rod by means of an incision perpendicular to the rod axis. The two halves, namely the fixed half and the loose half, form respective clamping jaws which are held together by a graphite ring, after the end of the silicon rod has been clamped between them.

"Graphite holders *2a* and *2b* are pushed, in part into metal pipes *3a* and *3b*, being firmly seated therein. The metal pipes are gas-tightly sealed in a common base structure 5, which may likewise consist of metal and is preferably made hollow, and is provided with stub pipes for the supply and discharge of a coolant such as water. The flow of coolant is indicated by arrows *k*. The metal pipe *3a* may be directly soldered to the metallic base structure 5. This requires the insulating of the other metal pipe *3b* by means of a sleeve 4 of electrically non-conducting material relative to the metallic base structure 5. The insulating sleeve 4 may consist, for example, of glass, porcelain or other ceramics, or of plastics. The metal pipes 3*a* and 3*b* must be gas-tightly sealed by a transverse wall or by a stopper, somewhere within the interior of the pipes, or at their lower end.

"The silicon rods 1*a* and 1*b* may also be directly clamped in the respective metal pipes 3*a* and 3*b*, thus eliminating the carbon clamps or holders 2*a* and 2*b*. This, however, requires giving the silicon rod at the clamping ends a larger cross section than elsewhere, so that these clamping locations are not as strongly heated during the heat processing as the thinner rod portions.

"The carrier rods 1*a* and 1*b* extend parallel to each other so that their free ends do not touch. These ends are conductively connected with each other by a bridge 6 of high-purity graphite. This bridge 6 also consists preferably of spectral carbon. It may be provided with bores engaging the upper ends of the respective rods 1*a* and 1*b*.

"The base structure 5 also accommodates an inlet pipe 7 for the gaseous reaction mixture from which the semiconductor material is precipitated. The upper end of the inlet tubes 7 is nozzle shaped, and causes the fresh gas mixture to enter into the reaction space in turbulent flow as a free jet. During the precipitating process the nozzle must not be heated up to the reaction temperature. This is necessary in order to prevent the reaction from taking place within the nozzle, which would have the result that silicon deposited at the inner nozzle walls would narrow, or even clog, the nozzle opening. The tip of the nozle is therefore mounted below the upper ends of the carbon holders 2*a* and 2*b*. The jet of gas travels from the fastening points of the carrier rods in the longitudinal direction of the rods. The inlet pressure of the fresh gas mixture can be so adjusted that the rods 1*a* and 1*b* are flooded with fresh gas along their entire length. The gas leads through an outlet tube 8 which is likewise inserted into the base structure 5 and is gas-tightly sealed relative thereto. The gas inlet and the gas outlet are identified . . . by arrows *g*. A transparent bell 9 of glass or quartz is gas-tightly sealed and fastened on the base structure 5, and encloses the reaction space."

Any other pertinent portions of Schweickert et al. are incorporated herein by reference.

We modify the Schweickert apparatus by providing a vessel 20, which contains a liquid compound 21 of the semiconductor compound, for example, silicochloroform, pre-processed in accordance with out invention. A hydrogen gas current is supplied through line 22 below the level of semiconductor liquid and entrains some semiconductor liquid. The laden hydrogen current enters the reactor through line 7, which is above the liquid level.

The invention and its advantages will be disclosed more specifically with an example of the production of silicon from silicochloroform:

An aqueous solution of chromium trioxide ($CrO_3$) is added using a nitrogen atmosphere to commercial, liquid silicochloroform ($SiHCl_3$), containing for example methyldichlorinesilane and possibly, other carbon compounds. It is preferable to add so much chromic acid that all carbon compounds in the silicochloroform are oxidized. This quantity is such that the red color produced by the chromium acid in the silicochloroform does not disappear even after prolonged agitation. This result may be achieved by adding a solution of 0.2 to 20 g. chromium trioxide, in 1 to 20 milliliter water per liter of silicochloroform. An addition of 1 g. chromium trioxide, dissolved in 1.5 milliliter water per liter of silicochloroform, was found to be favorable. Subsequently, the silicochloroform is mixed 1 to 10 hours, preferably 5 hours, in a nitrogen atmosphere. During this time the chromium acid oxidizes the carbon compounds, contain in the silicochloroform, without noticeably attacking the latter. Methyldichloridesilane oxidizes into carbon. Thereafter 4 to 80 g. per liter of silicochloroform of finely pulverized sodium, potassium or calcium hydroxide is added to bind the oxidation products and the excess chromium acid, which is recognizable through the red color of the silicochloroform. A preferred addition was found to be 10 g. sodium hydroxide per liter of silicochloroform. Carbon dioxide is bound on nonvolatile carbonates.

A better wetting of the alkali or alkaline earth hydroxide by the silicochloroform and thereby an improved neutralization of the acids is obtained if 0.1 to 2 milliliter concentrated sulphuric acid ($H_2SO_4$) per liter of silicochloroform, is added to the aqueous chromium trioxide solution. A preferred addition per liter of commercial silicochloroform consists of 1 g. chromium trioxide and 0.5 milliliter concentrated sulphuric acid, dissolved in 1.5 milliliter water.

Alternatively the carbon compounds in silicochloroform may be oxidized by adding per liter of silicochloroform, 1 to 30 cc. of a 3% aqueous solution of permanganic acid ($HMnO_4$) or bromic acid ($HBrO_3$), containing 1 to 25% by weight of concentrated sulphuric acid. Thereafter, the silicochloroform is agitated 1 to 10 hours. Finally, 4 to 80 g. finely pulverized sodium or potassium hydroxide per liter silicochloroform is added to bind the oxidation products. With conventional or commercial silicochloroform, it is favorable to use, per liter, 20 cc. of a 3% aqueous solution of permanganic acid or bromic acid, containing 20% by weight of concentrated sulphuric acid. Following the addition of said solution, the silicochloroform is mixed for 5 hours. To bind the oxidation product, an addition of 20 g. finely pulverized sodium or potassium calcium oxide per liter of silicochloroform was found to be sufficient.

The thus pre-treated silicochloroform is now vaporized, in a known manner, with pure hydrogen and passed into a reaction chamber, comprised e.g. of a quartz bell and sealed in an air-tight manner as described above with reference to Schweickert et al. In this reaction chamber, two thin carrier rods, heated by electric current and comprised of silicon, are arranged vertically detached (self supporting) on graphite holders and are current-conductively connected at their upper ends by a graphite or silicon bridge. Since, following the neutralization of the acids in the liquid silicochloroform, produced by oxidation, only few or no carbon containing compounds whatsoever, are distilled off from the silicochloroform during evaporation, the reduction and the thermal dissociation of the gaseous silicochloroform occurring at the heated carrier rods, are accompanied by little if any precipitation of carbon.

The term "hydroxide" as used in the claims unless otherwise limited refers to a hydroxide selected from sodium, potassium and calcium hydroxides.

We claim:

1. A method of obtaining purest semiconductor material by vaporizing a liquid compound of the semiconductor material, and precipitating the semiconductor material through at least a partial reaction of the vaporized compound upon a solid heated carrier body which comprises prior to the evaporation of the liquid compound of the semiconductor material, oxidizing the carbon compounds contained in said liquid compound of said semiconductor material by adding an oxidizing agent selected from the group comprising aqueous solutions of chromium trioxide, permanganic acid and bromic acid, and binding the oxidation products by adding a non-volatile base.

2. The method of claim 1, wherein the semiconductor material is selected from silicon and germanium.

3. The method of claim 1, wherein the non-volatile base is anhydrous hydroxide selected from sodium hydroxide, potassium hydroxide and calcium hydroxide.

4. The method of claim 1 wherein a solution of 0.2 to 20 g. chromium trioxide and 0.1 to 2 milliliter concentrated sulphuric acid, in 1 to 20 milliliter water are added per liter of silicochloroform, mixing the silicochloroform 1 to 10 hours and adding thereafter 4 to 80 g. finely pulverized anhydrous hydroxide selected from sodium, potassium and calcium to the silicochloroform, per liter of the latter.

5. The method of claim 4, wherein a solution of 1 g. chromium trioxide and 0.5 milliliter concentrated sulphuric acid in 1.5 milliliter water are added per liter of silicochloroform, mixing the silicochloroform for 5 hours and thereafter adding 10 g. finely pulverized sodium hydroxide per liter silicochloroform.

6. The method of claim 1, wherein to each liter of silicochloroform is added 1 to 30 cc. of a 3% aqueous solution of permanganic acid ($HMnO_4$), which contains 1 to 25% by weight concentrated sulphuric acid, mixing the silicochloroform for 1 to 10 hours and then finally adding 4 to 80 g. finely pulverized hydroxide per 1 liter of silicochloroform.

7. The method of claim 1, wherein to each liter of silicochloroform is added 1 to 30 cc. of a 3% aqueous solution of bromic acid ($HBrO_3$), which contains 1 to 25% by weight concentrated sulphuric acid, mixing the silicochloroform for 1 to 10 hours and then finally adding 4 to 80 g. finely pulverized hydroxide per 1 liter of silicochloroform.

8. The method of claim 6, wherein to each liter of silicochloroform are added, 20 cc. of a 3% hydrous solution of permanganic acid ($HMnO_4$) containing 20% by weight concentrated sulphuric acid, following which the silicochloroform is mixed for 5 hours, and thereafter adding 20 g. finely pulverized hydroxide per liter.

9. The method of claim 7, wherein to each liter of silicochloroform are added, 20 cc. of a 3% hydrous solution of bromic acid ($HBrO_3$) containing 20% by weight concentrated sulphuric acid, following which the silicochloroform is mixed for 5 hours, and thereafter adding 20 g. finely pulverized hydroxide per liter.

10. The method of claim 1, wherein the process is conducted in a protective gas atmosphere.

11. The method of claim 1, wherein the semiconductor material is precipitated at least through a partial reduction of the vaporized compound by employing a pure gaseous reducing agent.

12. The method of claim 1, wherein the oxidizing solution contains sulfuric acid.

References Cited

UNITED STATES PATENTS

| | | | |
|---|---|---|---|
| 3,403,003 | 9/1968 | Philip | 23—205 |
| 3,120,451 | 2/1964 | Schmidt et al. | 117—106 |

WILLIAM L. JARVIS, Primary Examiner

U.S. Cl. X.R.

23—223.5; 117—106